United States Patent
Hill et al.

[11] Patent Number: 5,938,103
[45] Date of Patent: Aug. 17, 1999

[54] METHOD AND APPARATUS FOR MINIMIZING THE DISTORTION IN COLD PRESSURE WELDING

[75] Inventors: Norris L. Hill, New Bloomfield; Thomas L. Linsenbardt, Lohman; Kevin D. Ronden, Meta, all of Mo.

[73] Assignee: ABB Power T&D Company Inc., Raleigh, N.C.

[21] Appl. No.: 08/837,989

[22] Filed: Apr. 15, 1997

[51] Int. Cl.⁶ .................................................. B23K 20/02
[52] U.S. Cl. ...................... 228/115; 228/212; 228/235.1
[58] Field of Search ................................. 228/115, 212, 228/235.1, 265, 3.1

[56] References Cited

U.S. PATENT DOCUMENTS

| | | | |
|---|---|---|---|
| 2,522,408 | 9/1950 | Sowter | 78/92 |
| 2,707,821 | 5/1955 | Sowter | 29/432 |
| 2,736,090 | 2/1956 | Sowter | 29/470.1 |
| 2,763,057 | 9/1956 | Clair, Jr. | 228/115 |
| 3,224,658 | 12/1965 | Clair, Jr. | 228/3.1 |
| 3,303,255 | 2/1967 | Bracey | 264/248 |
| 3,397,453 | 8/1968 | Gwyn, Jr. | 29/630 |
| 3,537,171 | 11/1970 | Wilson et al. | 228/115 |
| 3,762,029 | 10/1973 | Jackson et al. | 228/115 |
| 3,786,559 | 1/1974 | Smith | 29/470.1 |
| 3,937,383 | 2/1976 | Sawert | 228/115 |
| 4,183,558 | 1/1980 | Broodman | 285/189 |
| 4,281,786 | 8/1981 | Krueger | 228/116 |
| 4,315,175 | 2/1982 | Hamilton et al. | 228/115 |
| 4,414,742 | 11/1983 | Shibata | 29/882 |
| 4,468,161 | 8/1984 | Krueger | 411/171 |
| 5,020,217 | 6/1991 | Gonzalez | 29/882 |
| 5,161,403 | 11/1992 | Kitchens | 72/414 |
| 5,243,757 | 9/1993 | Grabbe et al. | 29/882 |

*Primary Examiner*—Samuel M. Heinrich
*Attorney, Agent, or Firm*—Woodcock Washburn Kurtz Mackiewicz & Norris LLP

[57] ABSTRACT

A method and apparatus are disclosed for minimizing the distortion in cold pressure welding and producing a spot lap weld with a controlled thickness. A distortion control device is utilized which includes a cavity of predetermined depth and area adequate to receive the metal flow resulting from the spot lap weld to be formed.

3 Claims, 4 Drawing Sheets

PRIOR-ART

PRIOR-ART

PRIOR-ART

METHOD AND APPARATUS FOR MINIMIZING THE DISTORTION IN COLD PRESSURE WELDING

FIELD OF THE INVENTION

This invention relates to a method of cold pressure welding utilizing a distortion control device which allows non-ferrous metals to be joined with a controlled thickness and a minimum of distortion of the welded materials.

BACKGROUND OF THE INVENTION

Cold pressure welding has been used extensively to join non-ferrous metals for making electrical connections. Up to the present time, the use of cold welding to join metals has resulted in considerable deformation of the materials in the area of the weld joint. Consequently, the use of cold pressure welded joints in electrical transformer windings has resulted in significant loss of space, generally referred to as space factor, in the coils. In the design of a transformer coil, careful consideration is given to eliminating wasted space. Any space in the coil between conductor layers or layers of conductive turns not required for insulating, cooling or other electrical purposes increases the product's costs.

Conventional cold pressure welding makes use of one or more indentors which penetrate a sandwich of two or more materials to be joined causing a flow of metal that produces a metallurgical bonding of the materials. During penetration of the materials, the materials are forced against an anvil or base plate and in most cases held there by a stripper plate which has holes that allow the indentor to pass through to penetrate the materials. The stripper plate is commonly die spring loaded which generally can impart enough force so that the materials are held against the anvil during indentor removal. As the indentors penetrate the materials, the displaced metal flows away from an area in front of each indentor in a perpendicular direction from the penetration causing material in the area surrounding each indentor to expand. This expansion causes the length and width of the sandwiched materials to grow which causes buckling. At the same time indentor bulges occur due to the inability of the stripper plate to constrain the sandwich to a desired thickness. An example of such prior art cold pressure welding is illustrated in FIGS. 1 and 2. Other examples of prior art cold pressure welding are illustrated in U.S. Pat. Nos. 2,522,408 and 2,707,821.

It would be desirable to provide a method and apparatus for cold pressure welding wherein the distortion and buckling of the non-ferrous metal parts being cold welded or joined is substantially eliminated.

SUMMARY OF THE INVENTION

In accordance with one aspect of the invention there is provided a method of cold pressure welding of at least two pieces of non-ferrous metals to form a spot lap weld to join the metals with a minimum of distortion. The method comprises the steps of cleaning the areas of contact of the metals to be joined to the extent that no foreign substance or oxides remain on the contacting metal surfaces and placing the clean surfaces in contact with each other in a manner of a lap weld on a support surface. The method further includes the step of applying a first predetermined pressure throughout an annular area surrounding the central area of the contacting metal surfaces in which the spot lap weld is to be formed, the first predetermined pressure being of a magnitude adequate to hold the metal surfaces in contact throughout the annular area and prevent cold flow of metal from the central area during the welding. The method further includes the step of applying a second predetermined pressure to the central area of the contacting metal surfaces within the area of the spot lap weld to be formed, the second predetermined pressure being of a magnitude sufficient to weld the metal pieces together by reducing the thickness of the metal pieces within at least one area of the spot lap weld in a manner which forces the metal displaced from the at least one area of cold flow away therefrom while being confined within the annular area surrounding the spot lap weld to minimize distortion of the welded metal pieces.

In accordance with another aspect of the invention there is provided in apparatus for pressure welding pieces of non-ferrous metals to form a spot lap weld without the use of external heat wherein the pieces of metal to be joined in surface to surface contact are supported on a support surface, the areas of contact to be joined being substantially free of foreign substance on the contacting metal surfaces, the improvement of a distortion control device which enables the non-ferrous metals to be joined with a minimum distortion of the welded materials. The distortion control device comprises a pressure plate having a centrally disposed recessed cavity in one side thereof profiled to control by restriction metal flow, the recessed cavity having a depth adequate to receive the metal flow resulting from the spot lap weld to be formed. The pressure plate has an annular surface area surrounding the recessed cavity for contacting one of the non-ferrous metals to be joined. The pressure plate also has structure on the opposite side from the recessed cavity and opposite the annular surface area to which a first pressure is applied for applying a predetermined pressure throughout the annular area surrounding the central area of the contacting metal surfaces in which the spot lap weld is to be formed so as to confine the metal flow within the cavity. The pressure plate also has at least one opening extending through the pressure plate into the cavity for receiving an indentor to which pressure is applied for producing the metal flow and the spot lap weld.

DETAILED DESCRIPTION OF THE PREFERRED EMBODIMENT

Figure 1:
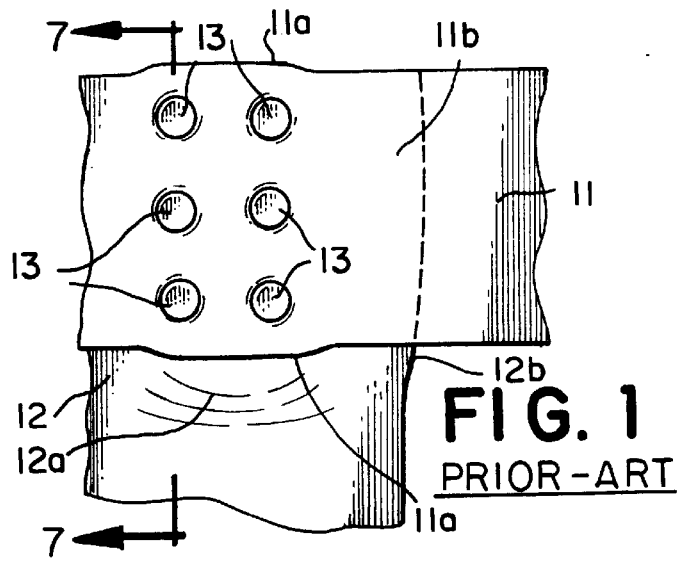
FIG. 1 is a top plan view of a cold pressure lap weld produced in accordance with the prior art.
Figure 2:
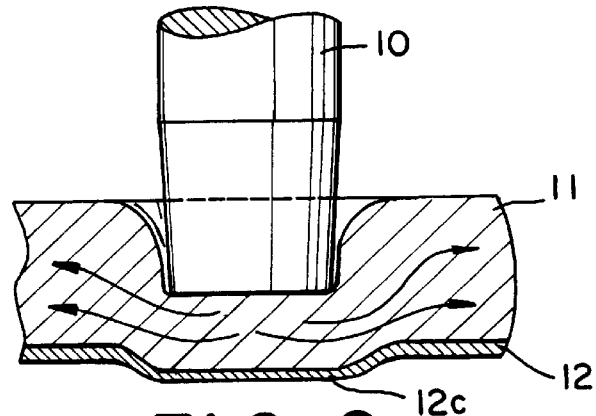
FIG. 2 is a sectional view taken along the lines 2—2 in FIG. 1 showing an indentor at half penetration producing the flow of metal in producing a lap weld according to the prior art.
Figure 7:
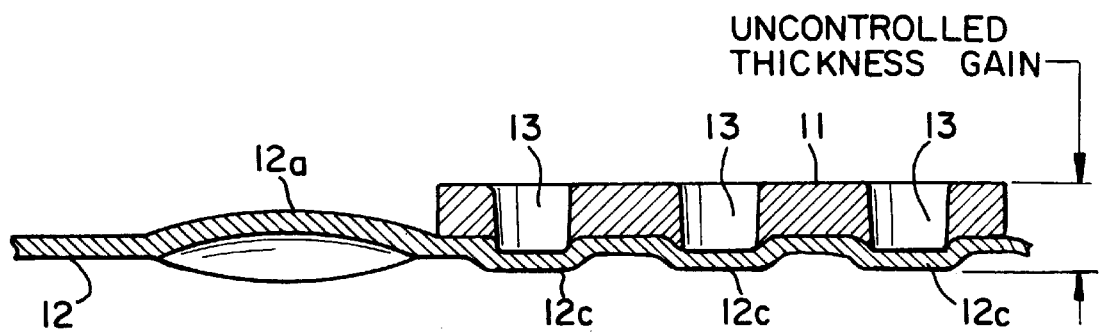
FIG. 7 is a sectional view on enlarged scale taken along the lines 7—7 in FIG. 1.

Referring to FIGS. 1 and 2 there is illustrated an example of conventional cold pressure welding for joining non-ferrous metals such for example as lead, copper, aluminum, etc. Conventional cold pressure welding makes use of one or more indentors 10, FIG. 2, which penetrate a sandwich of two or more materials 11 and 12 to be joined causing a flow of metal as indicated by the arrows that produces a metallurgical bonding of the materials. The lap weld illustrated in FIGS. 1 and 7 includes six indentor craters 13 and was produced with six indentors, only one indentor 10 being shown in FIG. 2. The indentors 10 are generally devices shaped like hole punches which can have a round, oblong, or a rectangular foot print and are usually slightly tapered to permit easy retraction after penetrating the materials to be welded or joined. During the penetration of the materials, the materials are forced against an anvil or base plate, not shown, and in most cases held there by a stripper plate, not shown, which has holes that allow the indentors to pass through to penetrate the materials. The stripper plate is commonly die spring loaded which generally can impart enough force so that the materials are held against the anvil during the indentor removal. As the indentor penetrates the materials, the displaced metal flows away from an area in front of each indentor in a perpendicular direction from the penetration causing the material in the area surrounding each indentor to expand as illustrated in FIG. 2. This expansion causes the length and width of the sandwiched materials 11 and 12 to grow as indicated at 11a and 11b and 12a and 12b, FIG. 1, which causes buckling. At the same time indentor bulges 12c, FIGS. 2 and 7 occur due to the inability of the stripper plate to constrain the sandwich to a desired or controlled thickness. An example of the uncontrolled thickness gain is illustrated in FIG. 7.

Figure 3:
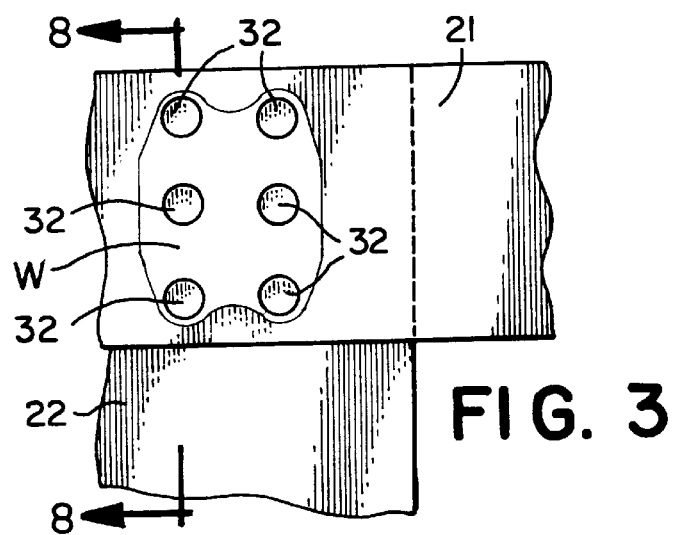
FIG. 3 is a plan view of a cold pressure lap weld produced in accordance with the present invention.
Figure 4:
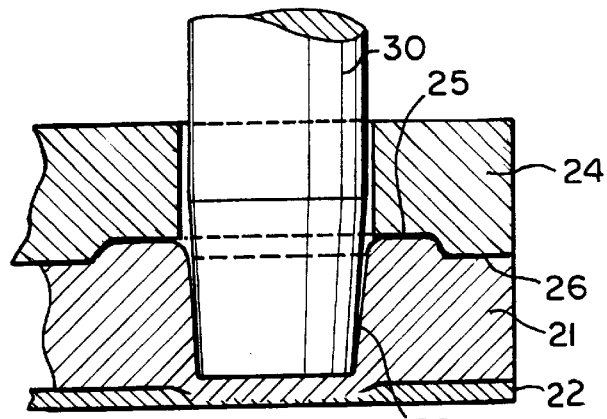
FIG. 4 is a sectional view taken along the lines 4—4 in FIG. 3 showing an indentor at full penetration producing one of the lap weld areas in FIG. 3.
Figure 5:
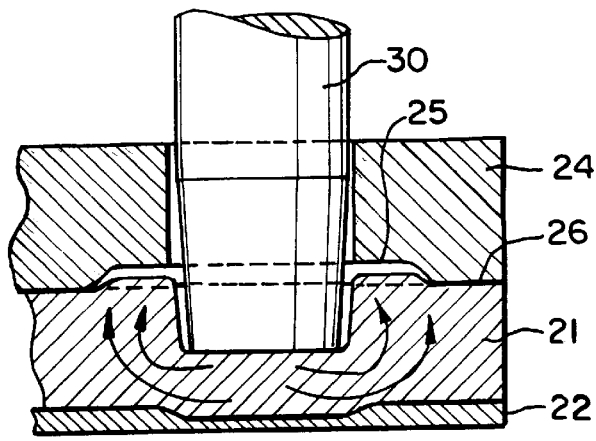
FIG. 5 is a sectional view similar to FIG. 4 showing the indentor partially penetrating the metals to be joined by a lap weld and showing the flow of metal in producing the lap weld joint.
Figure 6:
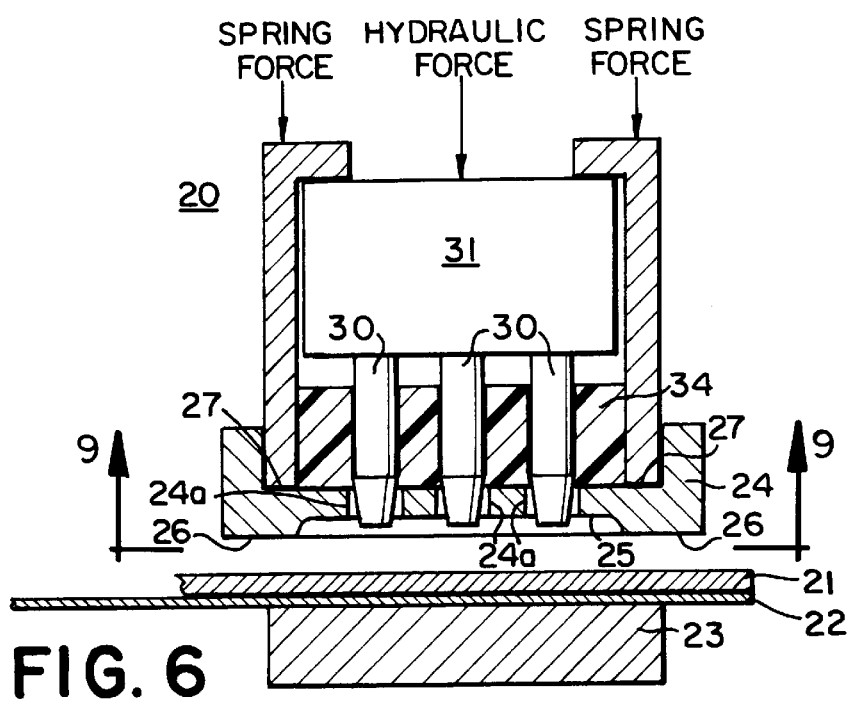
FIG. 6 is a view of the apparatus for producing the cold pressure lap weld of the present invention.
Figure 8:
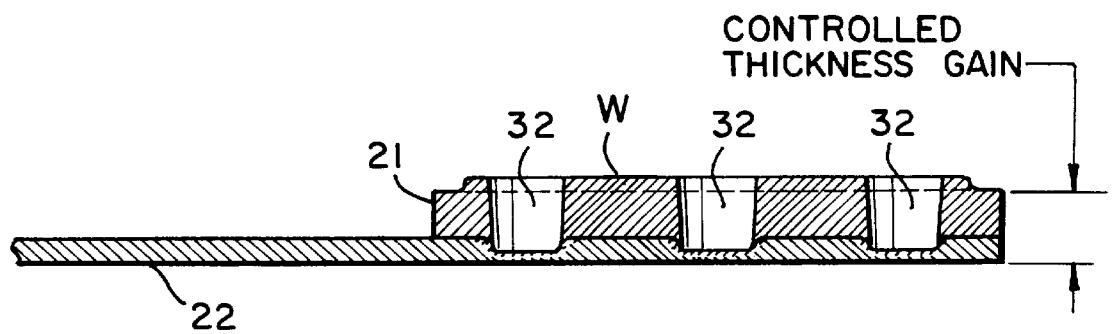
FIG. 8 is a sectional view on enlarged scale taken along the lines 8—8 in FIG. 3.
Figure 9:
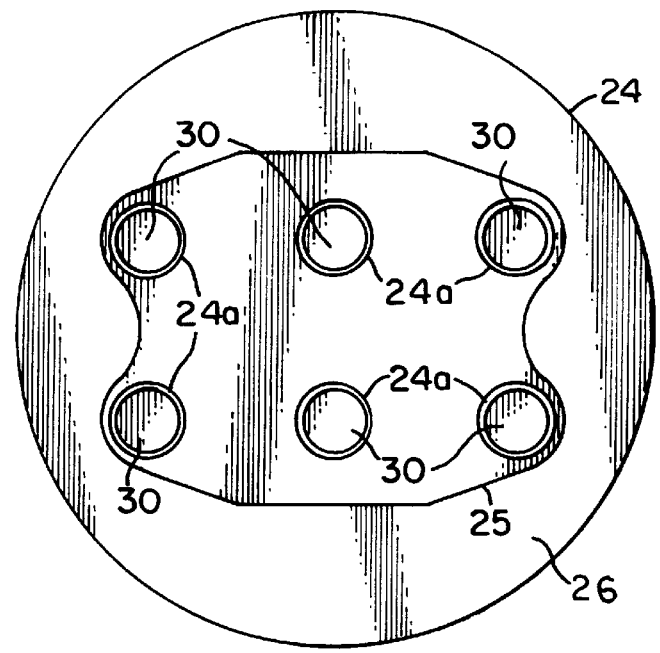
FIG. 9 is a view taken along the lines 9—9 in FIG. 6 showing the face of the pressure plate.

Referring to FIGS. 3–6 there will now be described the method of cold pressure welding according to the present invention utilizing a distortion control device which allows non-ferrous metals to be joined with minimum distortion of the welded materials. Referring to FIG. 6 there is shown an apparatus 20 for pressure welding pieces of non-ferrous metals 21 and 22, such as copper or aluminum, to form a spot lap weld, as shown in FIGS. 3, 4 and 8, without the use of external heat. The pieces of metal 21 and 22 to be joined in surface to surface contact are supported on a support surface or anvil 23. The areas of contact on the metal pieces 21 and 22 are substantially free of foreign substance and oxides on the contacting metal surfaces. A distortion control device which enables the non-ferrous metals to be joined with a minimum distortion of the welded materials comprises a pressure plate 24 having a centrally disposed recessed cavity 25 in one side thereof to control by restriction metal flow. The recessed cavity 25 has a depth and area adequate to receive and restrict the metal flow resulting from the spot lap weld to be formed between the two metal pieces 21 and 22. The periphery of the recessed cavity 25 corresponds to the outline of the displaced metal accumulation at the spot weld area W shown in FIG. 3. The pressure plate 24 has an annular surface area 26, FIGS. 6 and 9, surrounding the recessed cavity 25 for contacting the adjacent non-ferrous metal piece 21 to be joined to the non-ferrous metal piece 22, FIG. 6. The pressure plate 24 has annular structure 27 on the opposite side from the recessed cavity 25 and opposite the annular surface area 26 to which a first pressure is applied.

The first pressure is derived from an hydraulic force as hereinafter described. The spring force illustrated in FIG. 6 is for the purpose of initially moving the pressure plate 24 into contact with the uppermost metal piece 21 at the start of the welding operation and to impart enough force to the pressure plate 24 after the welding operation so that the pressure plate 24 functions as a stripper plate holding the welded materials against the anvil 23 during indentor removal. Spot welding apparatus for supplying the hydraulic force and spring force referred to in FIG. 6 is well known in the art. One example is apparatus sold under the trademark ENERPAC® by Enerpac, Butler, Wis. 53007.

As shown in FIG. 6 a plurality of indentors 30 depend from a piston or indentor block 31 which is driven from a suitable hydraulic force. The indentors 30 shown in FIG. 6 are shaped like hole punches which can have a round, oblong, or a rectangular footprint and are usually slightly tapered to permit easy retraction after penetrating the materials to be welded or joined. The indentors 30 at their lower ends extend through corresponding openings 24a through the pressure plate 24 and into the cavity 25. As shown in FIG. 6 the indentors 30 also extend through a urethane pad 34 that is positioned between the piston 31 and the pressure plate 24. When pressure is applied to the piston 31, this causes the piston to move downwardly along with the indentors 30. When the piston 31 engages the urethane pad 34 this causes the pressure plate 24 also to move downwardly until it contacts the upper surface of the metal piece 21. The pressure applied to the pressure plate 24 throughout its annular surface area which surround the central area of the contacting surfaces in which the spot lap weld is to be formed is of a magnitude adequate to hold the metal surfaces in contact throughout the annular area and prevent cold flow of metal from the central area during the welding.

As the piston 31 moves downwardly, the lower ends of the indentors 30 engage the uppermost metal sheet 21 and apply a predetermined pressure to the central area of the contacting metal surfaces within the area of the spot lap weld to be formed. This predetermined pressure is of a magnitude sufficient to causes the indentors 30 to penetrate the sandwich of the metals 21 and 22 to be joined producing indentor craters 32 and causing a flow of metal that produces a metallurgical bonding of the materials. The pressure applied through the indentors 30 is of a magnitude sufficient to weld the metal pieces together by reducing the thickness of the metal pieces at the indentor craters 32 within the area of the spot lap weld W in a manner which forces the metal displaced from the area of reduced thickness to cold flow away therefrom while being confined within the annular area surrounding the spot lap weld to minimize distortion of the welded metal pieces. This is illustrated by the position of the indentor 30 in FIG. 5 where it moves from its half inserted position to the full inserted position in FIG. 4. It will be noted that as the cold flowing metal is displaced by the indentor 30, it flows upwardly into the recessed cavity 25, FIG. 5, until it substantially fills the cavity as shown in FIG. 4. The completed spot lap weld W is illustrated in FIG. 3 and the cross section through the spot lap weld W of FIG. 3 is shown in FIG. 8.

With the improved method of the present invention, the shape and depth of the cavity 25 in the pressure plate 24 can vary just as the shape and number of the indentors can vary, but the volume of the cavity must always be slightly more than the volume of the material displaced which is the sum of the displacement of the indentors which penetrate the varying thickness of the two or more sandwiched materials being joined. The depth of the recessed cavity 25 is dependent on the area of the cavity, but generally the depth can be limited to about 0.015" resulting in significant space savings over conventional cold welding methods. The depth of penetration of the indentors and the resultant material displacement is governed by an optimum pressure for a given indentor footprint area value and for the range of material thickness' being joined. The usual penetration of the indentor is from approximately 80% to 90% of the total thickness of the two materials being joined and at full penetration the molecules of the two or more materials have fused at the weld. The pressures required at the indentor face can be as high as 120,000 psi for both conventional cold welding and the improved method of the present invention. Satisfactory welds produced in accordance with the present method were obtained when the pressures generated under the surface of the indentors 30 were in the 100,000 to 120,000 psi range. The annular surface area 26 surrounding the cavity 25, FIGS. 6 and 9 required about 8,000 to about 10,000 psi to eliminate most distortion. Higher pressures can also be used on the annular area 26 although the pressure should not be so great as to mark the metals surrounding the weld area.

By comparing the sectional views of FIGS. 7 and 8, the advantages of the present invention will be seen. FIG. 7 illustrates a sectional view through a prior art cold pressure weld where there is an uncontrolled thickness gain. The bulges 12c appear at the bottom of the spot lap weld in the bottom metal piece 12 as does the distortion 12a. In FIG. 8 which is a cross section through the spot lap weld W of the present invention, the controlled thickness gain in overall thickness of the two materials 21 and 22 is at the top of the spot lap weld and the weld area is only increased by the thickness of the displaced metal accumulation confined within the recessed cavity. Thus where the depth of the recessed cavity 25 in the pressure plate 24 is 0.015" the thickness gain at the lap weld area will be limited to 0.015". It will also be noted in FIG. 8 that there are no bulges at the bottom of the spot lap weld W relative to the strip 22 and there is no distortion in the strip adjacent the spot lap weld.

Figure 10:
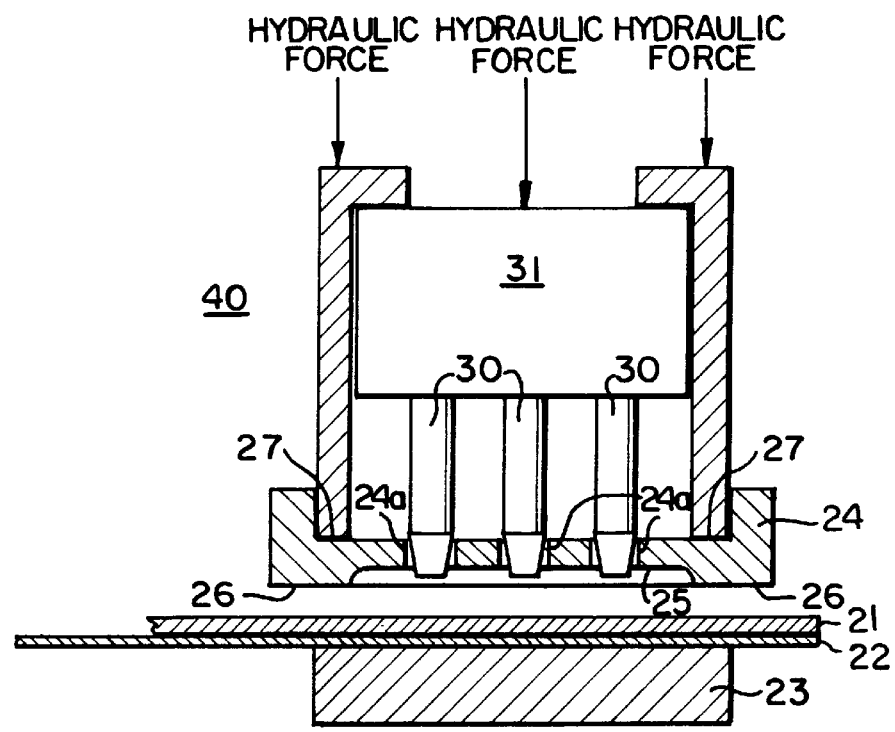
FIG. 10 is a modification of the apparatus for producing the cold pressure lap weld of the present invention.

Referring to FIG. 10 there is illustrated another embodiment 40 of the present invention. In the apparatus 20 shown in FIG. 6 the hydraulic force for the pressure plate 24 was slaved from the hydraulic force used to move the indentors 30 by way of the urethane pressure pad 34. This enables separate and independently adjustable forces to be applied to the pressure plate 24 and the indentors 30 but in an economical manner. In FIG. 10 the urethane foam pad 34 has been eliminated. Separate and independently adjustable hydraulic forces are applied to the pressure plate 24 and to the piston or indentor block 31. While the spring force has not been shown in FIG. 10 it is to be understood that springs can be utilized in the apparatus 40 of FIG. 10 in the same manner as in FIG. 6 so that the pressure plate 24 can also function as a stripper to aid in removal of the indentors from the welded materials.

It should be understood the invention is not limited to the specific arrangements shown, and that changes and modifications may be made within the scope of the appended claims.

What is claimed is:

1. The method of cold pressure welding of at least two pieces of non-ferrous metals to form a spot lap weld to join the metals with a minimum of distortion of the welded metal pieces comprising the steps of:

cleaning the areas of contact of the metal pieces to be joined to the extent that no foreign substance or oxides remain on the contacting metal surfaces, placing the cleaned metal surfaces in contact with each other on a support surface, applying a first predetermined pressure throughout an annular area surrounding a central area of the contacting metal surfaces in which the spot lap weld is to be formed, said first predetermined pressure being of a magnitude adequate to hold said metal surfaces in contact throughout said annular area and prevent cold flow of metal from said central area during the welding, applying a second predetermined pressure to said central area of said contacting metal surfaces within the area of said spot lap weld to be formed, said second predetermined pressure being of a magnitude sufficient to weld the metal pieces together by reducing the thickness of the metal pieces within at least one area of the spot lap weld in a manner which forces the metal displaced from the at least one area of reduced thickness to cold flow away therefrom while being confined within said first annular area surrounding the spot lap weld to minimize distortion of the welded metal pieces.

2. The method of cold pressure welding of at least two pieces of non-ferrous metals to form a spot lap weld to join the metals with a minimum of distortion of the welded metal pieces comprising the steps of:

cleaning the areas of contact of the metal pieces to be joined to the extent that no foreign substance or oxides remain on the contacting metal surfaces, placing the cleaned metal surfaces in contact with each other on a support surface, applying a first predetermined pressure throughout an annular area surrounding a central area of the contacting metal surfaces in which the spot lap weld is to be formed, said first predetermined pressure being of a magnitude adequate to hold said metal surfaces in contact throughout said annular area and prevent cold flow of metal from said central area during the welding, applying a second predetermined pressure to said central area of said contacting metal surfaces within the area of said spot lap weld to be formed, said second predetermined pressure being of a magnitude sufficient to weld the metal pieces together by reducing the thickness of the metal pieces within at least one area of the spot lap weld in a manner which forces the metal displaced from the at least one area of reduced thickness to cold flow away therefrom while being confined within said first annular area surrounding the spot lap weld to minimize distortion of the welded metal pieces, and wherein the second predetermined pressure is applied to a plurality of areas within the area of said spot lap weld to be formed so as to weld the metal pieces together by reducing the thickness of the metal pieces within the plurality of areas of the spot lap weld in a manner which forces the metal displaced from the plurality of areas of reduced metal thickness to cold flow away therefrom while being confined within the first annular area surrounding the spot lap weld to minimize distortion of the welded metal pieces.

3. The method of cold pressure welding of at least two pieces of non-ferrous metal to form a spot lap weld of controlled thickness comprising the steps of:

placing a sandwich of at least two pieces of non-ferrous metal on a support surface, placing a pressure plate on top of said sandwich of non-ferrous metals, said pressure plate having a centrally disposed recessed cavity in the side adjacent said sandwich of metals, said cavity being profiled to control by restriction metal flow, and having a depth adequate to receive the metal flow resulting from the spot lap weld to be formed, said pressure plate having an annular surface surrounding said recessed cavity for contacting the outermost piece of metal of the sandwich, said pressure plate having at least one opening extending through said pressure plate into said cavity for receiving an indentor, applying a first pressure to the annular surface of the pressure plate surrounding the recessed cavity for maintaining the sandwich of metals in contact with each other so as to confine the cold flow of the metal within the cavity during the welding, and applying a second pressure to at least one indentor extending through the at least one opening in the cavity for causing the metal to flow into the cavity and producing the spot lap weld.

* * * * *

UNITED STATES PATENT AND TRADEMARK OFFICE
CERTIFICATE OF CORRECTION

PATENT NO. : 5,938,103
DATED : August 17, 1999
INVENTOR(S) : Norris L. Hill; Thomas L. Linsenbardt; Kevin D. Rowden

It is certified that error appears in the above-identified patent and that said Letters Patent is hereby corrected as shown below:

Title, Page, [75]: name of third inventor should be --Kevin D. Rowden--

Signed and Sealed this

First Day of February, 2000

Attest:

Q. TODD DICKINSON

*Attesting Officer*     *Acting Commissioner of Patents and Trademarks*